E. HOWELL.

Hemmers for Sewing-Machines.

No. 5,414. Reissued May 20, 1873.

Witnesses.
Mort. M. Leggett.
C. C. Wilson

Inventor.
Edward Howell
by his attys.
Cox and Cox.

AM. PHOTO-LITHOGRAPHIC CO. N.Y. (OSBORNE'S PROCESS.)

UNITED STATES PATENT OFFICE.

EDWARD HOWELL, OF ASHTABULA, OHIO.

IMPROVEMENT IN HEMMERS FOR SEWING-MACHINES.

Specification forming part of Letters Patent No. 96,809, dated November 16, 1869; reissue No. 5,414, dated May 20, 1873; application filed June 3, 1870.

*To all whom it may concern:*

Be it known that I, EDWARD HOWELL, of Ashtabula, in the county of Ashtabula and State of Ohio, have invented certain new and useful Improvements in Hemmers for Sewing-Machines, of which the following is a specification, reference being had to the annexed drawing, in which—

Figure 1:
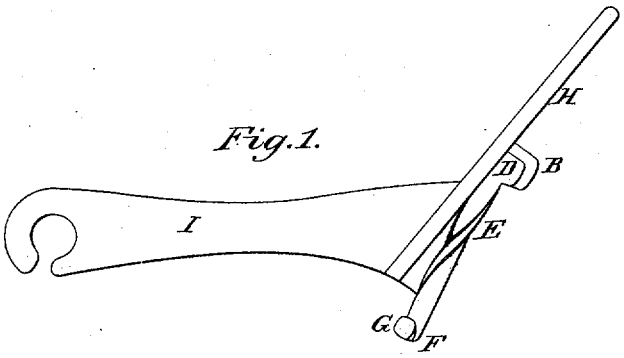
Figure 2:
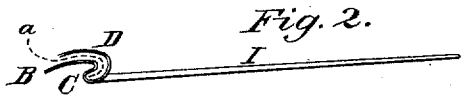
Figure 3:
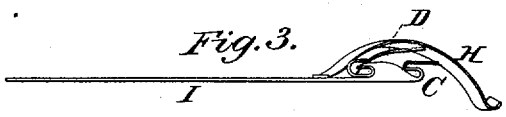
Figure 4:
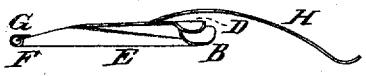
Figure 5:
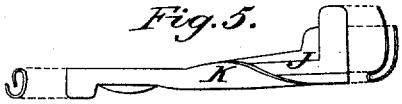

Fig. 1 represents a top view of the hemmer. Fig. 2 represents a view of that end of the hemmer at which the edge of the cloth enters to be folded into a hem. Fig. 3 represents a view of the end of the hemmer from which the folded hem issues, ready to be stitched. Fig. 4 represents a view of the side of the hemmer through which the cloth passes as the hem is formed. Fig. 5 represents a view of one of the modifications of my improved hemmer; and Fig. 6 represents a view of a piece of metallic plate, cut into the proper shape, preparatory to being bent into the body of the hemmer, represented in Figs. 1, 2, 3, and 4.

The drawing is not made to a scale, but this will create no difficulty in the construction of the hemmer, since it shows the form and arrangement of the parts which the constructor will adapt to the greatly varying sizes of the different varieties of hemmers made to which these improvements are applicable.

My invention consists, primarily, in providing the hemmer, at its receiving end, with a breadth-gage, formed as hereinafter described, so that while gaging the proper breadth of cloth for making the hem, it will at the same time completely turn the fold or plait of the hem, and present it ready to be flattened down, and turned again to complete the hem by the action of the helical surface of the interior of the tube of the hemmer, against which, in its progress through the hemmer, it is borne, and by which it is guided. My invention further consists in the combination with the helical surfaces of the tube for turning the second fold of the hem (*i. e.*, turning the plait against the under side of the cloth) of an arm over the end of the tube at which the hem emerges to prevent the second fold of the cloth from spreading out, or rising up, before being stitched.

Figure 6:
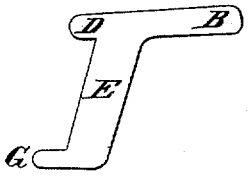

In Fig. 1, A represents the folder or hemmer, which is made of a thin plate of metal, first cut to the shape shown in Fig. 6, and then formed by bending into the required shape. The limb B, folded backward over the middle section of the plate, and again forward upon itself, forming an S-shaped curvature, C, as shown in Fig. 2. The limb D is then bent upward and over the S-shaped member B, thus embracing or covering said member, as shown in Fig. 2. These curvatures of the plate form a spiral space, into which the cloth, on entering the hemmer, is fed, so as to form the first turn or fold for the plait of the hem, as shown by the dotted line *a*, Fig. 2, which represent the cloth. The central section E of the plate, Fig. 6, has its back edge, to which the limbs D and G are attached, turned upward and over very near the front edge, to which the limb B is attached, which turning is effected at the same time with the turning over of the limb D, as already described. This turning is done in such manner that the plate thus turned will be in the form of a slit tube, somewhat pear-shaped in its cross-section, except at the end of the tube where the hem passes out, which is flattened, as shown in the drawing, Fig. 3, the narrow side of the tube being that on which the edges approximate to form a slit or slot to admit the margin of the cloth being hemmed into the hemmer, and allow it to pass through the same from end to end. After the plate has been thus folded into a tube, the end to which the limb G is attached is twisted round nearly a half-circle, in the opposite direction from which the back edge of the plate was turned to form the tube, as already described. This last turning gives to the tube a helical curvature, which extends nearly or quite to the breadth-gage, and gives to the slot formed by the approximating edges of the plate the helical form, shown best in Fig. 1. After the spiral breadth-gage, and helical tube, and slot have been thus formed, the limb G, Fig. 6, is turned upward and over the end of the tube, as shown in Figs. 1, 3, and 4.

If the arm G was omitted, and the helical slot left open to the end of the hemmer, the cloth would, by the oblique impulse or pressure, given to it by the helical slot, be forced beyond the side of the hemmer, more or less, making the hem wider than the discharge-aperture of the hemmer, and also irregular; and this spreading of the cloth over the back of the hemmer would, especially if it should be raised upward at the same time, unfold the hem after it emerged from the end of the tube, on its way to the needle, and thus would render the hem imperfect. These defects are all prevented by the operation of the arm G, and the cloth kept smoothly down upon the plait of the hem, so as to present an even surface to the needle, and thereby insure greater evenness and regularity in the hem. The tube thus shaped, is attached by soldering or otherwise to a shank, I, by which it is held in the proper position for work, on the table of the sewing-machine.

On entering the corner of a piece of cloth into the spiral opening at the mouth of the hemmer, as shown in Fig. 2, the edge of the cloth is folded under until arrested by the inner end of the spiral operating as a stop. This is important, because it avoids the difficulty which arises in other hemmers in which the folded edge is not arrested until it comes round against the overlying fold of the cloth, and becomes entangled therewith in the convolutions of the hemmer, whenever too great a breadth of cloth for the hem is admitted, which entanglement can only be undone by stopping the machine, disengaging the hemmer, and working the cloth out of it. The first fold formed, as already described, being pushed by the attendant into the tube until the end of the cloth meets the front (which is the lower) edge of the helical slot on the outside; the end of the fold turned under meeting, at the same time, or sooner, the interior surface of the spiral and rising gradually upon it. The palm of the operator's finger is now pressed upon the lower edge of the cloth, bearing it upon the helical slot, and at the same time pressing it forward, this carries the cloth outside, up along and across the tube, toward the back of the hemmer, the edge of the fold inside meanwhile moving in the same direction, and at the same time rising to the under side of the cloth, while the first fold or plait, is, by the same helical action, carried downward from the back toward the front of the tube and gradually turned until brought parallel, at the end of the tube, with the back of the cloth, the second fold being at the same time formed over the front or lower edge of the helical slot. The cloth is still pushed forward by the palm of the operator's finger or thumb, until it issues out of the end of the tube far enough to reach the needle and feed-motion of the sewing-machine, when, being placed properly within their reach, the feed-motion, when the machine is set going, will then draw the cloth through the hemmer as required. It will now be found that the cloth tends to move gradually out of the spiral of the breadth-gage, so that very soon there is too little breadth of cloth left in the tube to make a hem. To counteract this tendency, the operator may press the cloth in the opposite direction, and thus force it into the spiral the full breadth which the gage will admit. If the utmost watchfulness is not observed there will be too much cloth forced in, which will have the effect of clogging the hemmer or making a crooked hem; but such close attention to feeding the hemmer is incompatible with proper attention to the stitching, and therefore the presser-foot H is arranged to bear obliquely upon the edge of the cloth at a short distance before it entered the hemmer.

This presser-foot, in the example shown in the drawing, consists of a spring-arm, H, attached by one end to the shank of the tube, and arching obliquely over the mouth of the tube down to the table, where it is shaped into a foot curved up at its extremity to admit the cloth more easily under it. The back edge of the foot stands at about the same degree of obliquity to the line of the tube as the helical slot, and this edge tends to crease the cloth and bear it along obliquely toward the back of the hemmer, and thus is constantly thrusting the cloth into the spiral portion of the breadth-gage, and thereby counteracting the tendency before mentioned to throw it out of that spiral. If the cloth should, from becoming untangled, or from other causes, be deflected in its progress, in the opposite direction from that to which the foot tends to carry it, the foot would in that case be canted under the arch of the spring and bear with its corner with increased pressure upon the cloth, creasing into it more, and tending with increased power to deflect the cloth back again toward the hemmer, which being done, it would at once resume its normal position and relax its deflecting action upon the cloth.

The pressure of the foot upon the cloth, in addition to guiding and regulating the feed, as described, produces a gentle tension upon the cloth, which keeps it smooth and prevents it from entering the hemmer creased or crumpled, and thereby insures smoother and better work. The hemmer represented in Fig. 5 is without the presser-foot, and, besides, has its breadth-gage constructed with a less section of a spire than that shown in the other figures. The latter neither admits the proper breadth of cloth to form the hem in the best manner nor turns the edge under for the first fold, and on these accounts is not as effective as it would be if constructed in such particulars like the other hemmer; but it has a tongue, J, extending into the tube of the hemmer, which keeps the first fold of the hem spread and guides it until it reaches the helical portion of the tube, which is useful, and renders it more effective than it otherwise would be.

In such cases as (for any cause) it might be desirable not to employ the tongue J or presser-foot H, either or both of them may be omitted, although I deem both as contributing to the protection of the working of the hemmer more than enough to compensate the disadvantage of the increased complexity of construction which they involve.

What I claim is—

1. The hemmer, composed of portions D B E, folded and twisted as shown, and operating as described, to determine the width of hem, to fold the material as it enters the hemmer, to turn it again on itself, and to prevent the edge of the first fold from being turned against or entangled with the next fold.

2. The combination, with the twisted and folded hemmer hereinbefore described, of the arm G, to prevent the uppermost fold from rising.

3. The combination, with the folded and twisted hemmer hereinbefore described, of the presser-foot H, arranged and operating as described.

EDWARD HOWELL.

Witnesses:

CHANCEY RICHARDSON,

C. BOOTH.